United States Patent Office 2,716,307
Patented Aug. 30, 1955

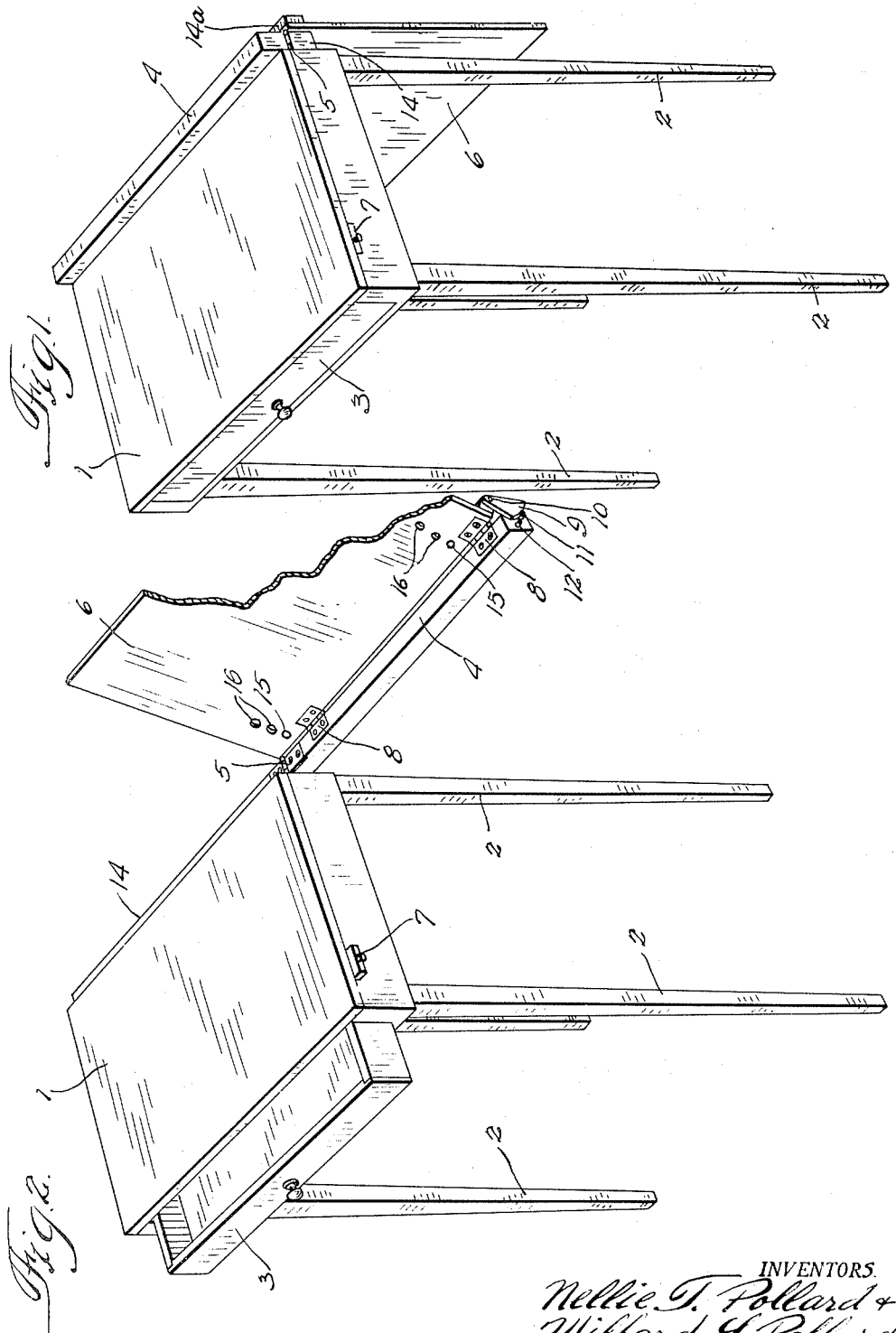

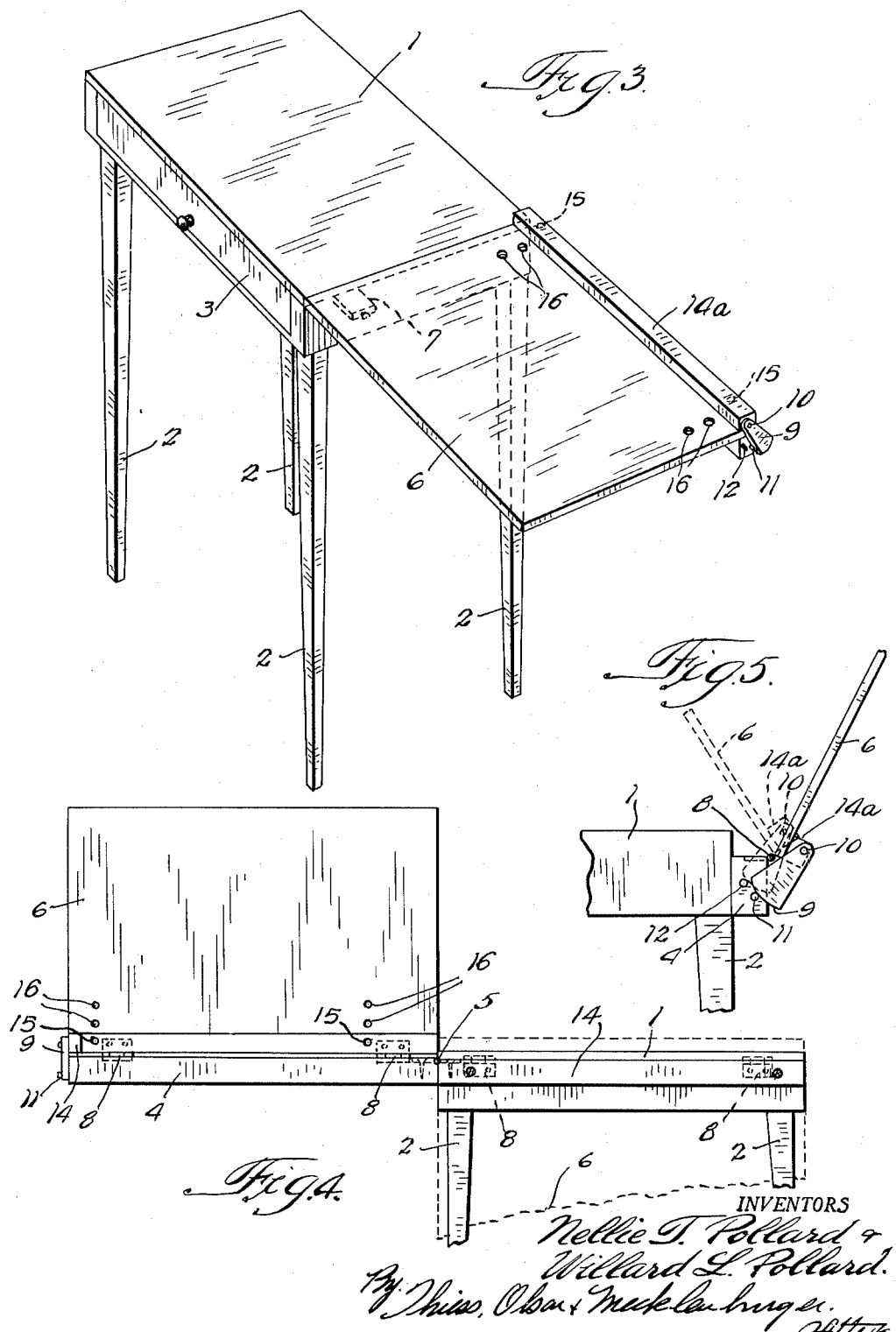

2,716,307

ADJUSTABLE READING LEAF STAND

Nellie T. Pollard and Willard L. Pollard, Evanston, Ill.

Application March 7, 1952, Serial No. 275,298

3 Claims. (Cl. 45—82)

This invention relates to an adjustable reading leaf stand.

An object of the invention is to provide an improved reading table having an arm extending therefrom on which is mounted an inclined leaf for supporting reading matter thereon extending upwardly from the arm.

A further object is to provide such a construction in which the reading leaf may be angularly adjusted about the arm to change the angle of inclination.

A further object is to provide a leaf arm rockably mounted adjacent a corner of the table top to move in general above the plane of the table top about a horizontal axis from a position in which it extends horizontally along the edge of the table top to a position in which it extends horizontally in the opposite direction, and a leaf mounted on said leaf arm which, when the leaf arm is in extended position, extends upwardly from the leaf arm for supporting reading material thereon.

A further object of the invention is to provide a reading table construction having a drawer underneath the table top and withdrawable from one side thereof, and a leaf arm mounted adjacent a corner of the table top remote from the side from which the drawer is withdrawn to move in general above the plane of the table top about a horizontal axis from a position in which it extends horizontally along an edge of the table top in the rear of said drawer to a position in which it extends horizontally in the opposite direction, and a leaf mounted on the leaf arm which, when the leaf arm is in extended position, extends upwardly from the leaf arm for supporting reading matter thereon.

A further object of the invention is to provide an improved reading table and table top extension leaf in which a leaf arm extends from the table top and the leaf is swingably mounted thereon from a position in which it extends upwardly in inclined position for supporting reading matter to a horizontal position in which it serves as an extension of the table top.

Further objects and advantages of the invention will be apparent from the description and claims.

In the drawings in which an embodiment of the invention is shown,

Figure 1 is a perspective view of a reading and writing table embodying the invention showing a reading leaf in a folded out-of-the-way position;

Fig. 2 is a similar perspective view showing the reading leaf in reading position and showing the drawer partly pulled out;

Fig. 3 is a similar perspective view showing the reading leaf folded down flat to serve as a leaf extension of the writing table;

Fig. 4 is a rear view of the table showing the reading leaf in reading position, and Fig. 5 is an end view of the table showing the reading leaf in one reading position in full lines and showing it in another reading position in dotted lines.

Referring to the drawings in detail, the construction shown comprises a table top 1 which may be used as a writing table, four legs 2 on which the top is supported, a drawer 3 mounted to slide from a position underneath the table top to an extended open position, a leaf arm 4 rockably mounted adjacent a corner of the table top to rock in general above the plane of the table top about a horizontal axis of the hinge 5 from a position in which it extends horizontally in one direction from the hinge 5 along the rear edge of the table top, with the leaf hanging downwardly from the rockable leaf arm, as shown in Fig. 1, to a position, shown in Fig. 2, in which the leaf arm 4 extends horizontally in the opposite direction and in which a reading material supporting leaf 6 mounted on the leaf arm is adjusted to extend upwardly and rearwardly. From this position (shown in Fig. 2) the supporting leaf may be swung downwardly and forwardly to the position shown in Fig. 3, in which it serves as an extension from the table top.

As shown in Fig. 1, when the leaf is in folded position, it extends downwardly in the rear of the rear end of the drawer 3, thus enabling the drawer to open from the front edge of the table. The table may be provided with a rest or stop 7 with which the swingable leaf 6 engages when moved to the position shown in Fig. 3. The leaf is hinged to the leaf arm by means of a pair of hinges 8 shown in Figs. 2 and 4. The leaf may be held in various adjusted upwardly and rearwardly inclined positions to vary the inclination of the leaf in any suitable manner as by a cam-like arm 9 pivoted at 10 to the swingable leaf and having its lower cam edge engageable with a supporting pin 11 secured to the outer end of the leaf arm. It may be held in various adjusted upwardly and rearwardly inclined positions as indicated by the dotted-line position shown in Fig. 5 by providing an additional rest pin or stop 12 with which the lower cam edge of the pivoted arm 9 may engage. This enables the reader to place the table on whichever side of the reading chair he desires. With the reading table on the left-hand side of the chair, the inclined leaf would be adjusted so as to extend in the dotted-line position shown in Fig. 5. With the reading table on the right-hand side, the leaf would be adjusted to the full-line position shown in Fig. 5.

The leaf-supporting arm is secured to swing from the position shown in Fig. 1 to the position shown in Fig. 2 by means of a hinge 5 shown in Figs. 1, 2, and 4 secured to a supporting strip 14 at the rear edge of the table top. This supporting strip may be secured to the table top so that its upper edge will be somewhat below the upper edge of the table top to assist in holding the swinging leaf in alignment when the table is in folded position.

In order to support the lower edge of the reading matter when the leaf is in the full-line position shown in Fig. 5, an adjustable height rest bar 14a may be used, provided with a pair of pins 15, one at each end thereof insertable into selected holes 16 in the leaf so that the bar can be adjusted to height as desired.

The use of the table has been outlined in general in connection with the description of the construction. When the table is to be used only as a writing desk or as a supporting table on which books or the like may be placed, the drawer 3 is closed and the leaf 6 folded as shown in Fig. 1. When the table is to be used for reading, it is pulled up along one side or the other of the chair, the leaf supporting arm 4 is swung around about the axis of the hinge 5 to the position shown in Fig. 2, and the leaf for supporting the reading material is adjusted to the desired angle. If the table were in the position shown in Fig. 1 and had a number of articles, such as books, placed on the table top and it was desired to use the table top as a writing desk, the arm and leaf would be swung to the position shown in Fig. 3, which would enable the writer to shift the books, etc., from the table top over onto the extension of the table top formed by the leaf, thus clearing the desk for action.

Further modifications will be apparent to those skilled in the art and it is desired, therefore, that the invention be limited only by the scope of the appended claims.

Having thus described my invention, what we claim and desire to secure by Letters Patent is:

1. Floor supported means for supporting a leaf in position to be used by a person seated in a chair, as a support for reading or writing material, comprising a table having a top mounted so that its upper surface is at a height greater than the height of the knees of a person seated in a chair, supporting legs in general below the plane of the table top and secured to the table, an arm rockably mounted on said table to swing first upwardly and then downwardly about a horizontal axis adjacent the top of the table, through substantially 180 degrees, from a first substantially horizontal position in which it extends along an edge of the table top to a second substantially horizontal posititon in which it extends from the table top at a height above the knees of the seated person, said leaf being rockably mounted on said arm to swing about an axis extending longitudinally of said arm, the rockable movement of said leaf on said arm being sufficient to enable the leaf to be suspended from its axial support, when the arm extends along the edge of the table top to lie in general below the level of the top, and to enable the leaf to be swung to a portion to support reading or writing material in position for one seated in the chair, when the arm is in position from which it extends from said table top.

2. Floor supported means for supporting a leaf in position to be used by a person seated in a chair, as a support for reading or writing material, comprising a table having a top mounted so that its upper surface is as a height greater than the height of the knees of a person seated in a chair, supporting legs in general below the plane of the table top and secured to the table, an arm rockably mounted on said table to swing first upwardly and then downwardly about a horizontal axis adjacent the top of the table, through substantially 180 degrees, from a first substantially horizontal position in which it extends along an edge of the table top to a second substantially horizontal position in which it extends from the table top at a height above the knees of the seated person, said leaf being rockably mounted on said arm to swing about an axis extending longitudinally of said arm, the rockable movement of said leaf on said arm being sufficient to enable the leaf to be suspended from its axial support, when the arm extends along the edge of the table top to lie in general below the level of the top, and to enable the leaf to be swung to a position to support reading or writing material in position for one seated in the chair, when the arm is in position from which it extends from said table top, said leaf supporting means comprising means for supporting said leaf in upwardly and rearwardly extending position for supporting the reading or writing material thereon.

3. Floor supported means for supporting a leaf in position to be used by a person seated in a chair, as a support for reading or writing material, comprising a table having a top mounted so that its upper surface is at a height greater than the height of the knees of a person seated in a chair, supporting legs in general below the plane of the table top and secured to the table, an arm rockably mounted on said table to swing first upwardly and then downwardly about a horizontal axis adjacent the top of the table, through substantially 180 degrees, from a first substantially horizontal position in which it extends along an edge of the table top to a second substantially horizontal position in which it extends from the table top at a height above the knees of the seated person, said leaf being rockably mounted on said arm to swing about an axis extending longitudinally of said arm, the rockable movement of said leaf on said arm being sufficient to enable the leaf to be suspended from its axial support, when the arm extends along the edge of the table top to lie in general below the level of the top, and to enable the leaf to be swung to a position to support reading or writing material in position for one seated in the chair, when the arm is in position from which it extends from said table top, said leaf supporting means comprising means for supporting said leaf in a position in which it extends rearwardly from said arm.

References Cited in the file of this patent

UNITED STATES PATENTS

| Number | Name | Date |
|---|---|---|
| 452,348 | Murray | May 12, 1891 |
| 2,584,101 | Stayboldt | Jan. 29, 1952 |